United States Patent
Nakano et al.

[11] Patent Number: 5,885,005
[45] Date of Patent: Mar. 23, 1999

[54] BEARING DEVICE AND SPINDLE MOTOR PROVIDED WITH THE BEARING DEVICE

[75] Inventors: Masaaki Nakano, Hitachi; Takashi Kono; Kenji Tomida, both of Ibaraki-ken; Tomoaki Inoue, Mito; Hiroshi Nishida, Kanagawa-ken; Yuji Nishimura, Odawara; Takeru Sato, Ashikaga; Sachio Hatori, Kiryu, all of Japan

[73] Assignees: Hitachi, Ltd.; Japan Servo Co., Ltd., both of Tokyo, Japan

[21] Appl. No.: 710,515
[22] Filed: Sep. 18, 1996
[30] Foreign Application Priority Data Sep. 20, 1995 [JP] Japan .................................... 7-241244

[51] Int. Cl.⁶ .................................................. F16C 32/06
[52] U.S. Cl. ......................... 384/113; 315/133; 315/371; 315/415
[58] Field of Search .................................... 384/100, 112, 384/113, 133, 371, 415, 389, 624

[56] References Cited

U.S. PATENT DOCUMENTS

| | | | |
|---|---|---|---|
| 3,597,026 | 8/1971 | Jarosh | 384/415 |
| 4,798,476 | 1/1989 | Sakatani et al. | 384/113 |
| 4,883,367 | 11/1989 | Maruyama | 384/112 |
| 5,018,880 | 5/1991 | Nakasugi et al. | 384/112 |
| 5,358,339 | 10/1994 | Konno et al. | 384/112 |
| 5,384,819 | 1/1995 | Ono . | |
| 5,427,456 | 6/1995 | Hensel | 384/112 |
| 5,466,070 | 11/1995 | Nakasugi | 384/112 |
| 5,524,502 | 6/1996 | Osanai | 384/113 |
| 5,559,382 | 9/1996 | Oku et al. | 384/112 |
| 5,658,080 | 8/1997 | Ichiyama | 384/112 |
| 5,659,445 | 8/1997 | Yoshida et al. | 384/112 |
| 5,688,053 | 11/1997 | Hoh et al. | 384/112 |
| 5,707,154 | 1/1998 | Ichiyama | 384/113 |

FOREIGN PATENT DOCUMENTS

| | | |
|---|---|---|
| 391640 | 10/1990 | European Pat. Off. . |
| 444651 | 9/1991 | European Pat. Off. . |
| 545903 | 6/1993 | European Pat. Off. . |
| 552808 | 7/1993 | European Pat. Off. . |
| 658895 | 6/1995 | European Pat. Off. . |

*Primary Examiner*—Charles A. Marmor
*Assistant Examiner*—Matthew A. Kaness
*Attorney, Agent, or Firm*—Antonelli, Terry, Stout & Kraus, LLP

[57] ABSTRACT

A bearing device where a sliding bearing rotatably supporting a shaft is molded with an inexpensive sintered material, three asymmetrical circular arc-shaped radial bearings are formed in the inner peripheral surface of the shaft, taper land-shaped thrust bearings are formed in the opposite end surfaces of the radial bearing surface, T-shaped bubble removing means which is constituted by axial and radial flow passages formed in the shaft opposed to the radial bearing is provided, and magnetic fluid is used as a lubricant. A magnetic disk unit using the bearing device is also disclosed.

17 Claims, 12 Drawing Sheets

STANDSTILL STATE

ROTATION STARTING STATE

STEADY ROTATION STATE

BEARING DEVICE AND SPINDLE MOTOR PROVIDED WITH THE BEARING DEVICE

BACKGROUND OF THE INVENTION

The present invention relates to a bearing device using a dynamic-pressure bearing where a lubricant is sealed to the bearing surface and also relates to a spindle motor provided with the bearing device.

In most of the spindle motors used in information equipment, ball bearings have been employed for supporting a rotating body. However, the ball bearing has limitations on high-accurate rotation and high-speed rotation and has become an obstacle to the high-accurate and high-speed operation of information equipment. When, on the other hand, a rotating body is supported by a sliding bearing, very high accurate rotation is possible because the rotating body can be supported by a film of dynamic-pressure oil with non-contact, and the sliding bearing is suitable for high-speed rotation.

A bearing device adopting the sliding bearing is disclosed, for example, in Japanese Patent Unexamined Publication No. 61-201916. In this publication, axial and radial gaps are provided between a rotational shaft and a housing as a means of preventing axial and radial vibrations, and magnetic fluid is sealed in the gaps so that the rotational shaft can be rotatably supported. In addition, seal devices are provided on the opposite ends of the housing, and step-shaped bearing-force generating members are provided on the surface and the opposite ends of the rotational shaft. With the dynamic-pressure effect caused by rotation, accuracy of rotation is stably maintained while suppressing vibration.

Although a sliding bearing is not employed, in Japanese Utility Model Unexamined Publication No. 3-117120 there is disclosed a method of lubricating a radial bearing. A rotational shaft is made hollow and one end thereof is immersed in an oil collecting portion provided in the lower portion of the radial bearing. Oil is drawn up by the pumping effect caused due to rotation and is supplied to holes opened at positions corresponding to upper and lower radial bearings, whereby the lubrication of the radial bearings disposed on upper and lower sides of the rotational shaft is performed.

In addition, in Japanese Patent Unexamined Publication No. 6-187720 there is disclosed a structure where a pre-load is applied to a spindle in the radial direction by a magnetic pre-load device disposed eccentrically with respect to the spindle to enhance the rigidity of the bearing. Axial and radial flow passages are provided in the spindle. One end of the axial flow passage is communicated with the surface of a thrust bearing, and the radial flow passage is communicated with the oil chamber and the space between upper and lower radial bearings. A lubricant is supplied from one end of the axial flow passage to the bearing portion and then sealed with a plug.

When the spindle is supported by the sliding bearing, the spindle needs to be positioned in the radial and axial directions and also radial and thrust bearings are needed as a means of preventing vibration, and a lubricant is sealed by using a seal device in the radial and thrust bearings.

On the other hand, when the spindle is assembled or the lubricant is sealed, there is the problem that air remains on the bearing portion and bubbles flow to the sliding surface of the bearing. In this case, the oil film breaks on the bearing surface, the rigidity is remarkably reduced, and unstable vibration occurs. If temperature rises, bubbles will grow and this tendency will be further accelerated.

In the aforementioned technique disclosed in Japanese Patent Unexamined Publication No. 61-201916, the rigidity of the oil film is increased by the dynamic-pressure effect of the step-shaped bearing-force generating groove to enhance accuracy of rotation, however, a means of removing bubbles from the bearing during rotation is not provided. Therefore, if air particles remain unremoved in the bearing when a lubricant is sealed, the air particles will grow into bubbles. As a result, there is the possibility that the bubbles flow to the lubrication surface, impede the dynamic-pressure effect of the bearing-force generating groove, reduce the rigidity of the lubricant, and give rise to unstable vibration.

In the aforementioned technique disclosed in Japanese Utility Model Unexamined Publication No. 3-117120, a lubricating oil is drawn from the end of the hollow shaft by the pumping effect caused due to rotation and is supplied to the ball bearing, and the problem of the dynamic pressure reduction in the bearing portion caused by bubbles does not exist. Therefore, this technique pays no regard to the means for removing bubbles.

In the aforementioned technique disclosed in Japanese Patent Unexamined Publication No. 6-187720, axial and radial flow passages are provided in a spindle, and a lubricant is supplied from one end of the spindle to radial and thrust bearings and then sealed with a plug. The other end of the spindle is disposed in contact with the thrust bearing, so when the spindle is rotated, a pumping effect of sucking the lubricant from the other end of the spindle into the axial flow passage cannot be expected. Therefore, the axial and radial flow passages do not serve as a means of removing bubbles.

OBJECT AND SUMMARY OF THE INVENTION

An object of the present invention is to provide a bearing device and a spindle motor which are capable of forming a suitable pressure distribution, enhancing bearing rigidity, and obtaining very accurate rotational performance by forming a lubricant which is suitable for the dynamic-pressure generating portion of a sliding bearing.

Another object of the present invention is to provide magnetic disk units, optical disk units, laser beam printers, and video tape recorders where the reliability of device operation is better, by making a bearing device provided in a device or a spindle motor so that the rotation is obtained with a high degree of accuracy.

To achieve the aforementioned objects, in a bearing device rotatably supporting a shaft by a sliding bearing where a lubricant is sealed, there is provided bubble removing means which is operated by rotation of the shaft and removes bubbles from a bearing surface of the sliding bearing.

In the bearing device, a first flow passage may be formed in the shaft along a rotational axis direction of the shaft, and a second flow passage may be connected from the first flow passage to the outer peripheral surface of the shaft opposed to a bearing surface of the sliding bearing. Furthermore, an end of the first flow passage opposite to the second flow passage may be connected to an opening provided in one end surface of the shaft, and the bearing surface and the opening may be connected by a third flow passage.

The third flow passage may be provided as a lubricant sink which covers the end surface of the shaft in which the opening is provided.

In addition, in a bearing device which comprises a shaft fitted in a hub and a sliding bearing contacted internally with a housing and rotatably supports the shaft, the bearing device according to the present invention further comprises:

a radial bearing with dynamic-pressure generating means provided in either an inner peripheral surface of the sliding bearing or an outer peripheral surface of the shaft;

a first thrust bearing having a bearing surface provided at one end on the hub side of the radial bearing so as to be opposed to a boss end surface of the hub and also having dynamic-pressure generating means provided on either the bearing surface or the boss end surface;

a flange provided on an end of the shaft;

a second thrust bearing having a bearing surface provided at the other end of the radial bearing so as to be opposed to a surface on the hub side of the flange and also having dynamic-pressure generating means provided on either the bearing surface or the flange surface opposed to the bearing surface;

first and second flow passages formed in the shaft, the first flow passage extending along the rotational axis direction of the shaft and being opened at the end of the shaft opposite to the end of the shaft fitted in the hub, and the second flow passage being connected from the first flow passage to the outer peripheral surface of the shaft opposed to the bearing surface of the sliding bearing;

a space formed by the flange and the housing around the end surface of the shaft on which the flange is provided, the space being connected to the surface of the second thrust bearing; and a lubricant sealed in the bearing surface and the space.

The space may be formed by a seal cap firmly attached to the housing.

In the aforementioned bearing devices, a bubble guide groove may be provided in either the outer peripheral surface of the shaft or the sliding bearing (or the inner peripheral surface of the radial bearing).

In the aforementioned bearing devices, the second flow passage may comprise a plurality of flow passages provided in the rotational axis direction of the shaft.

In the aforementioned bearing devices, a spiral groove may be formed in the surface of the first flow passage so that the lubricant is sucked from the opening provided in the shaft end surface into the first flow passage by rotation of the shaft.

In the aforementioned bearing devices, the second flow passage may comprise a plurality of flow passages which extend from the first flow passage in the radial direction of the shaft and which are disposed on the outer peripheral surface of the shaft at equal intervals.

In the aforementioned bearing devices, it is preferable that a diameter ratio of the diameter of the shaft to the diameter of the hub is set to a range of 0.15 to 0.25 and a diameter ratio of the diameter of the first flow passage to the diameter of the shaft is set to a range of 0.3 to 0.6.

Also, in order to achieve the aforementioned objects, the aforementioned spindle motor is used for rotating the disks of a magnetic disk unit.

In addition, in order to achieve the aforementioned objects, the bearing device according to the present invention is used in a motor which drives the polygon mirror of a laser beam printer. Therefore, a laser beam printer where a stable image is obtained is obtainable.

Furthermore, the aforementioned spindle motor is used for rotating the cylinder of a video tape recorder.

In the present invention, magnetic fluid may be used as a lubricant.

It is difficult to completely remove the bubbles remaining in a bearing. However, even if bubbles remain unremoved more or less, the spindle motor constructed as described above can prevent bubbles from going into the dynamic-pressure generating portion of the sliding surface of the bearing during rotation by the bubble removing means provided in the bearing. That is, if a shaft is rotated, a pumping effect will be caused by the axial passage provided in the shaft and the radial passage extending from the axial passage to the outer peripheral surface of the shaft opposed to the sliding surface of the bearing. With this pumping effect, the lubricant is sucked from the lubricant sink (or lubricant passage) provided in the shaft end through the opening formed in the shaft end and is discharged into the bearing.

At this time, the lubricant with a large specific gravity flows to the sliding surface of the bearing by centrifugal force, but, on the other hand, air with a small specific gravity which remains in the bearing becomes small bubbles. The small bubbles float to the low-pressure side of the bearing and is discharged outside the bearing.

Thus, in the present invention, bubbles whose specific gravity is small are slowly moved by the centrifugal bubble separating effect of the bubble removing device with respect to the flow of the magnetic fluid whose specific gravity is large, and the bubbles are discharged from the sliding surface of the bearing. Then, the bubbles stay near the end of the shaft or in the flow passages provided in the shaft, but there is no possibility that the bubbles are reintroduced into the bearing.

For this reason, no bubbles are contained in the lubricant or the magnetic fluid in the gap of the sliding surface of the bearing and the dynamic-pressure generating portion. Therefore, even if temperature changed due to a rise in the temperature or a change in the operating environment during the operation of the device, the change in the rigidity of the bearing would be minimized by the change in the viscosity of the lubricant or the magnetic fluid and therefore a break in the oil film could be prevented. Because the oil film is stably formed on the sliding surface of the bearing, shaft vibration can be suppressed and very accurate rotational performance can be maintained. Also, the abnormal temperature rise due to the break in the oil film can be prevented, and the evaporation of the lubricant or the magnetic fluid and an acceleration in the deterioration can be prevented.

If the shaft diameter ratio of the shaft to the diameter of the hub is made small, the rigidity will be reduced. If, on the other hand, the shaft diameter ratio is increased, the volume of a motor which is provided in the hub will be limited. Therefore, it is preferable that a diameter ratio of the diameter of the shaft to the diameter of the hub is set to 0.2. In practical use, it is preferable that the diameter ratio of the shaft is set in the range of 0.15 to 0.25. In addition, if the diameter of the first flow passage to the diameter of the shaft is increased, the bubble removing efficiency will be enhanced and the loss in the bearing portion will be reduced, however, the efficiency will soon saturate. Also, if the diameter of the first flow passage is further increased, the rigidity of the shaft will be reduced. Hence, it is preferable that a diameter ratio of the diameter of the first flow passage to the diameter of the shaft is set to the range of 0.3 to 0.6.

In addition, if the aforementioned bearing device or the spindle motor using the bearing device is applied to magnetic disk units, optical disk units, laser beam printers, and video tape recorders, the operating characteristic of each device will become stable and the better reliability of device operation can be obtained.

BRIEF DESCRIPTION OF THE DRAWINGS

The above and other objects and advantages will become apparent from the following detailed description when read in conjunction with the accompanying drawings wherein.

DESCRIPTION OF THE EMBODIMENTS

A preferred embodiment of the present invention will hereinafter be described with reference to FIGS. 1 through 3.

Figure 1:
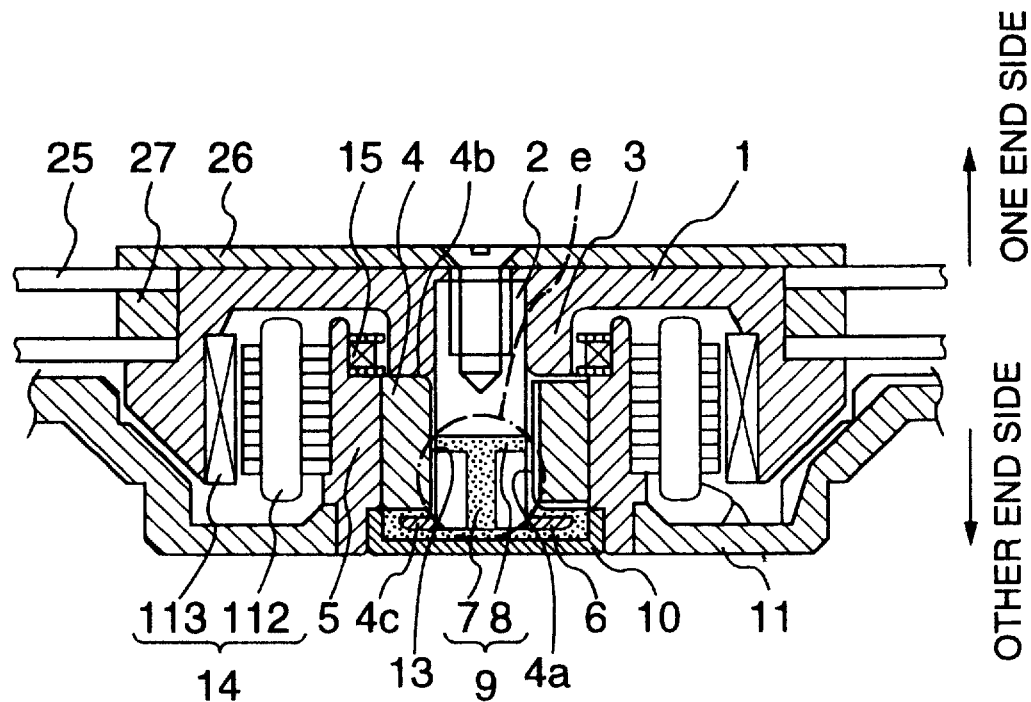
FIG. 1 is a vertical sectional view of a spindle motor of an embodiment of the present invention.

FIG. 1 is a longitudinal sectional view of a spindle motor for a magnetic disk unit, constructed in accordance with the present invention. In the figure a shaft 2 is inserted and fixed to the boss portion 3 of a hub 1 on which magnetic disks 25 are mounted. A sliding bearing 4 is provided on the inner peripheral side of a housing 5, which is located inside the hub 1. The inner peripheral portion and the opposite end portions of the sliding bearing 4 are constituted by a radial bearing 4a and thrust bearings 4b and 4c, respectively, and these bearings are integrally formed. The radial bearing 4a supports the hub 1 through the small gap between the radial bearing 4a and the shaft 2 so that the hub 1 can freely rotate.

A stator 112 is attached to the outer peripheral portion of the housing 5 fixed to a base plate 11. A rotor magnet 113 is firmly attached to the inner peripheral surface of the hub 1 opposed to the stator 112. The stator 112 and the rotor magnet 113 constitute a motor 14 which rotates the hub 1.

One end of the sliding bearing 4 is disposed in opposition to the end of the boss portion 3 of the hub 1 through a small gap and the other end is disposed in opposition to a thrust plate 6 fixed to the end of the shaft 2 through a small gap. With this disposition, the opposite ends of the sliding bearing 4 perform the axial positioning of the hub 1 and serve as thrust bearings 4b and 4c which support weights, such as the hub 1 and the magnetic disks 25. The magnetic disks 25 are clamped through a spacer 27 by a clamp 26.

In the space where the radial bearing 4a and the thrust bearings 4b and 4c are disposed, magnetic fluid 13 is sealed as a lubricant. A seal cap 10 is provided on the lower portion of the shaft 2 and hermetically fixed to the other end of the housing 5 by means of a screw or an adhesive, whereby the leakage of the magnetic fluid 13 to the outside is prevented.

On the other hand, on one end of the housing 5 there is provided a magnetic fluid seal 15. The magnetic fluid seal 15 forms a magnetic circuit between the outer peripheral surface of the boss portion 3 of the permeable hub 1 and the housing 5. The magnetic circuit captures the magnetic fluid 13 sealed in the gap between the outer peripheral surface of the boss portion 3 and the magnetic fluid seal 15 and prevents the magnetic fluid 13 from flowing out to the outside. In this way, the magnetic fluid 13 in the inside of the bearing 4 is sealed by the magnetic fluid seal 15 and the seal cap 10, and it is used both as a lubricant and for sealing itself.

The aforementioned embodiment of the present invention is constituted by a bearing device provided with a T-shaped bubble removing device 9, where an axial flow passage 7 extends from the center of the other end of the rotating shaft 2 in the axial direction and a radial flow passage 8 perpendicularly crossing the axial flow passage 7 is penetrated and formed at a position opposed to the sliding surface of the radial bearing 4a. Note that the radial flow passage 8 may comprise a single flow passage, but it is preferable that a plurality of radial flow passages are provided at regular intervals on the circumference of the shaft 2 and also that the flow passage area is reduced with respect to the axial flow passage 7, because the radial flow passages can exhibit the function of the bubble removing device 9 more effectively.

Figure 2:
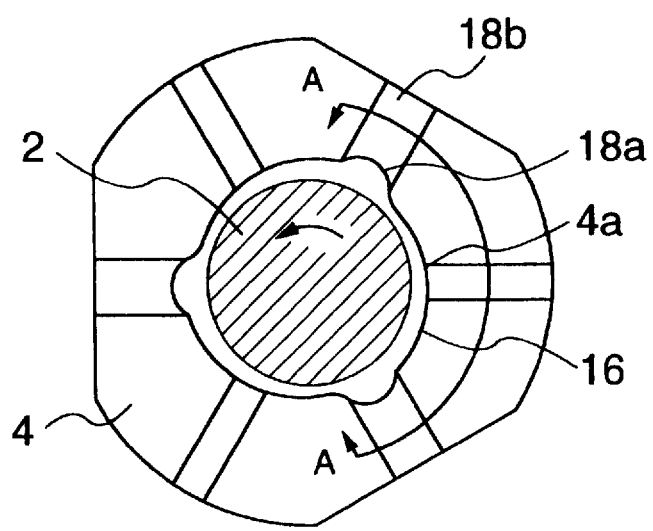
FIG. 2 is a plan view of the sliding bearing shown in FIG. 1.
Figure 3:
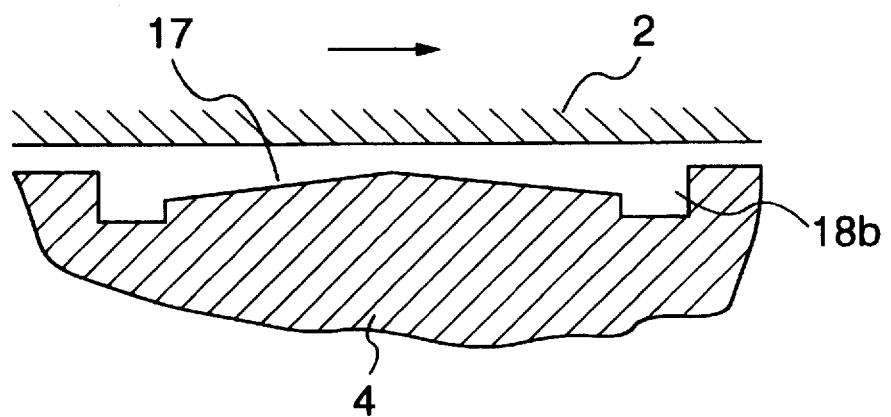
FIG. 3 is a sectional view taken substantially along line A—A of FIG. 2.

FIG. 2 shows a plan view of the sliding bearing 4 and FIG. 3 shows a sectional view taken along line A—A of FIG. 2.

The sliding bearing 4 is molded into a sleeve shape with a die by using a sintered powder alloy which is very cheap in material cost or a plastic material, and dynamic-pressure generating means 16 and 17 are provided on the inner peripheral surface and opposite end surfaces of the sliding bearing 4 so as to exhibit dynamic pressure effects by rotation, respectively. The dynamic-pressure generating means can be easily formed by forming three asymmetrical circular-arc grooves 16 in the radial bearing 4a and symmetrical taper land grooves 17 in the thrust bearings 4b and 4c with dies. In addition, in the respective circular arc grooves 16 and taper land grooves 17, oil supply mechanisms 18a and 18b are provided at three equally-spaced positions in the axial and radial directions so that the magnetic fluid 13 can be easily introduced to the sliding surface.

Figure 4A:
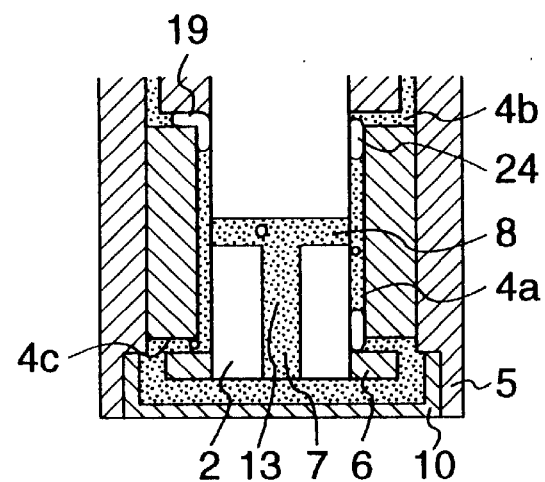
FIGS. 4A, 4B, and 4C are sectional views showing the function of the bubble removing device shown in FIG. 1.

Next, the motion of the magnetic-disk spindle motor constructed in the aforementioned way and the operation will be described by using FIGS. 4A, 4B and 4C which show the details of the "e" portion of FIG. 1.

If the coil of the stator 112 is conducted, the rotor magnet 113 will undergo a rotational force, and the hub 1 having the magnetic disks 25 mounted thereon and the shaft 2 will rotate. When the bearing 4 is at a standstill, the residual air at the time of assembling the motor becomes bubbles 19 as shown in FIG. 4A and the bubbles 19 are sealed into the magnetic fluid 13. These bubbles 19 cannot be simply diminished, although the magnetic fluid 13 is heated and the viscosity is reduced in order to remove bubbles when the magnetic fluid 13 is introduced. In addition, the air particles which are originally contained in the magnetic fluid oil or the air particles which have been left in the pore portion of the porous sintered material of the bearing 4 are collected onto the surface of the bearing by temperature change or rotation of the shaft 2, and the collected air particles grow into bubbles 19, so the bubbles cannot be simply removed.

Figure 4B:
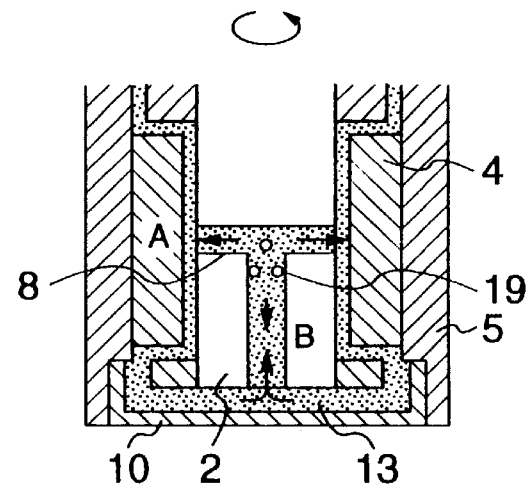
Figure 4C:
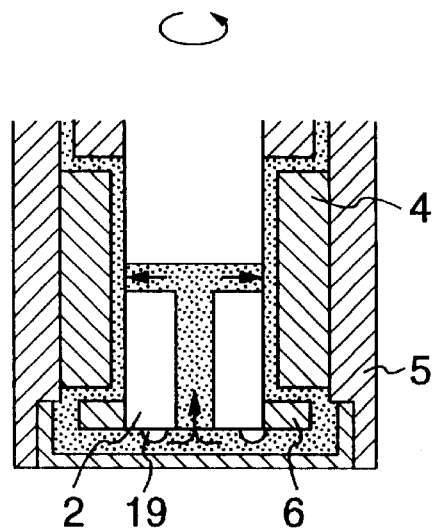

If the shaft 2 is rotated, the bubble removing device 9 is operated as shown in FIG. 4B. Because of the pumping effect of the bubble removing device 9, the magnetic fluid 13 is sucked from the axial flow passage 7 opened in the end of the shaft 2 and is discharged from the radial flow passage 8 to the inner peripheral surface of the bearing 4, as shown by an arrow A. When this occurs, the magnetic fluid 13 with a large specific gravity flows to the radial bearing 4a of the bearing 4 due to a difference of specific gravity caused by centrifugal force. However, bubbles 19 with a small specific gravity, which remain unremoved within the bearing 4, become small bubbles and float from the oil supply grooves 18a and 18b through the radial flow passages to the low-pressure side as shown by an arrow B. The bubbles 19 are discharged from the end of the axial flow passage 7 to the outside of the bearing. Then, the bubbles 19 stay near the entrance of the end of the shaft 2 as shown in FIG. 4C but there is no possibility that the bubbles are reintroduced into the bearing.

Thus, because bubbles 19 are not contained between the sliding surface of the bearing and the shaft or in the magnetic fluid 13 of the dynamic-pressure generating portion during the operation of the bubble removing device 9, stable oil film is formed.

Figure 5A:
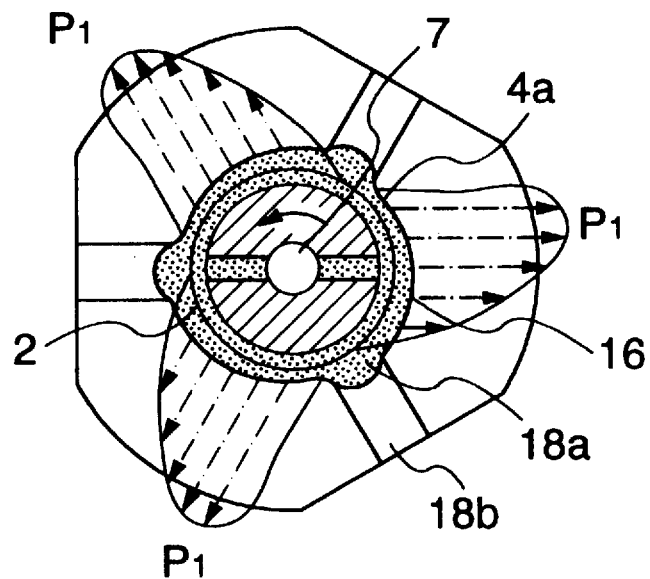
FIGS. 5A and 5B are diagrams used to explain a dynamic-pressure distribution which occurs in three asymmetrical circular-arc bearing portions of the present invention.
Figure 5B:
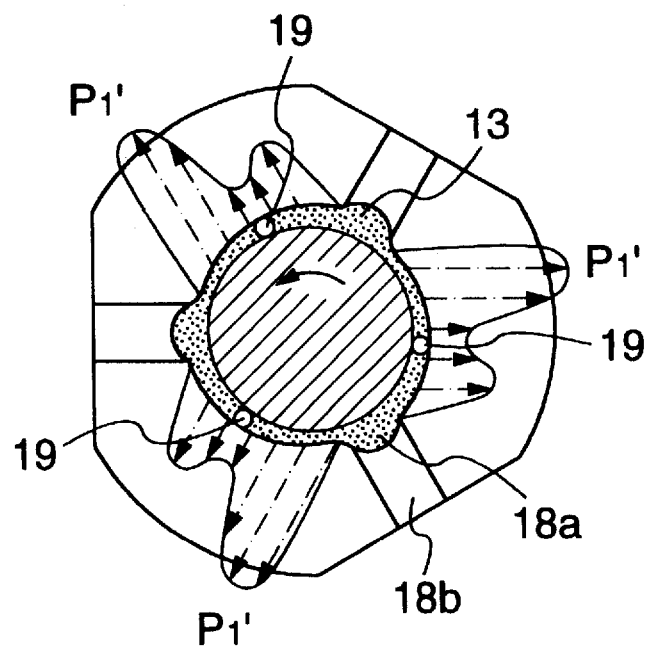

The state of occurrence of the oil film pressure will be described with FIGS. 5A, 5B, 6A and 6B. FIGS. 5A and 5B show the oil film pressure distribution on the radial bearing, while FIGS. 6A and 6B show the oil film pressure distribution on the thrust bearing surface.

As shown in FIGS. 5A and 5B, three asymmetrical circular-arc grooves 13 of a shape such as the gap between the shaft 2 and the radial bearing 4a becomes narrower in the rotational direction of the shaft 2 are provided in the radial bearing 4a at three equally-spaced positions, so the magnetic fluid 13 flowing into these portions are increased in pressure by the dynamic pressure effect caused due to rotation and, as shown in FIG. 5A, oil film pressure distributions $P_1$ occur in correspondence with the number of the circular arc grooves. The peaks of the oil film pressure distributions $P_1$ take place at intervals of 120°, and even if the shaft 2 were shifted from the center, the pressure in the reduced gap would become high and act so that the shaft 2 is returned to the center position. Therefore, the rotational center of the shaft 2 is stably held.

FIG. 5B shows an example of the case where bubbles 19 are contained in the sliding surface of the bearing. In such a case, the oil film breaks locally due to the bubbles, so the oil film pressure distributions $P_1'$ have depressed portions and are relatively reduced in size. In addition, the profiles of the pressure distributions $P_1'$ differ depending upon the contained state of the bubbles flowing to the three asymmetrical circular arc surfaces 16, and the rigidity is reduced and the unstable phenomenon of the rotating body cannot be avoided. Furthermore, the bubble removing device depends upon the operating environment. If it is used at a high-temperature region, the oil film thickness will also become thin. Since the break in the oil film is enlarged, metals directly contact each other and are often worn away abnormally.

Figure 6A:
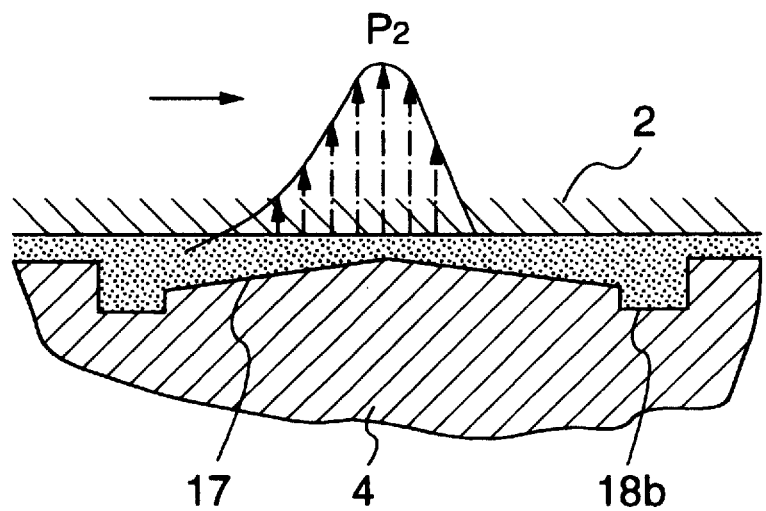
FIGS. 6A and 6B are diagrams used to explain a dynamic-pressure distribution which occurs in a taper land bearing portion of the present invention.
Figure 6B:
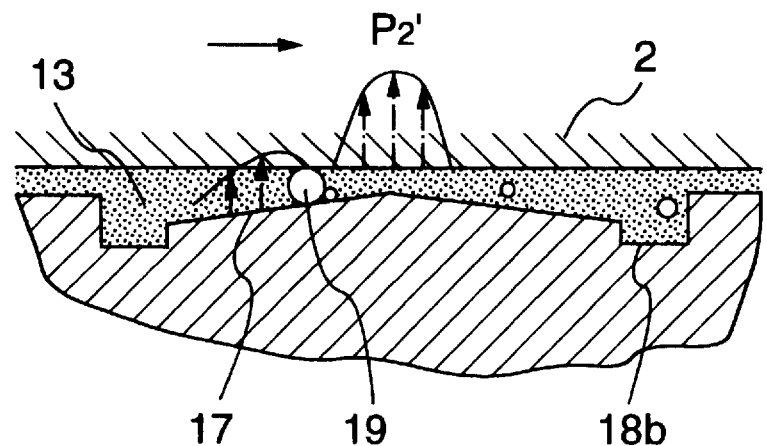

On the other hand, as shown in FIGS. 6A and 6B, taper land grooves 17 are formed in each of the thrust bearings 4b and 4c at three equally-spaced positions. If no bubbles 19 are contained as with the aforementioned case, a normal oil film pressure distribution $P_2$ will be generated as shown in FIG. 6A. If, however, bubbles 19 are contained, the pressure distribution $P_2$ will become as shown in FIG. 6B, as with the aforementioned case, and an unstable phenomenon will occur because the rigidity is also reduced considerably.

Also, the state of occurrence of the bubbles 19 is slightly varied even by the temperature rise or environment change during the operation of the device, and the slight variation causes vibration. However, since the magnetic fluid 13 containing no bubbles 19 can be supplied to the sliding surface of the bearing by providing the bubble removing device 9 in the bearing, only the viscosity would change even if the temperature of the magnetic fluid changed, and an oil film pressure distribution is stably formed on the sliding surface of the bearing. Therefore, the vibration of the shaft can be suppressed and the rotation of the shaft can be maintained with a high degree of accuracy.

Figure 7:
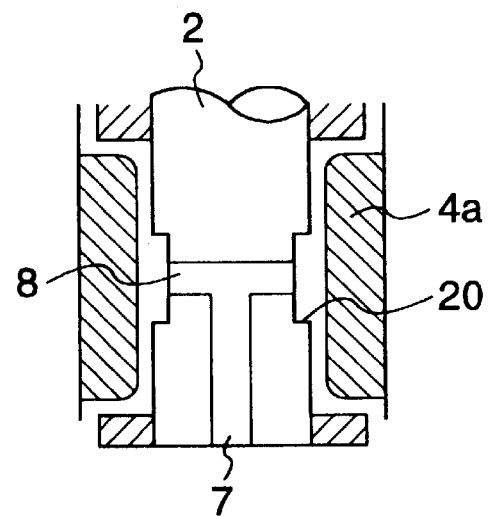
FIG. 7 is a vertical sectional view showing a bubble removing device of a second embodiment of the present invention.

Furthermore, in the bubble removing device 9, as shown in FIG. 7, a bubble guiding groove 20 is provided in the outer peripheral surface of the shaft 2 so that it is communicated with the radial flow passage 8 formed in the shaft. With this arrangement, the bubbles 19 in the oil supply grooves 18a and 18b or in the narrow bearing gap can be easily collected in the bubble guiding groove 20 and the removal of the bubbles becomes easy. When the bubble guiding groove 20 is provided in the inner peripheral surface of the radial bearing 4a, the same effect can be obtained.

Figure 8:
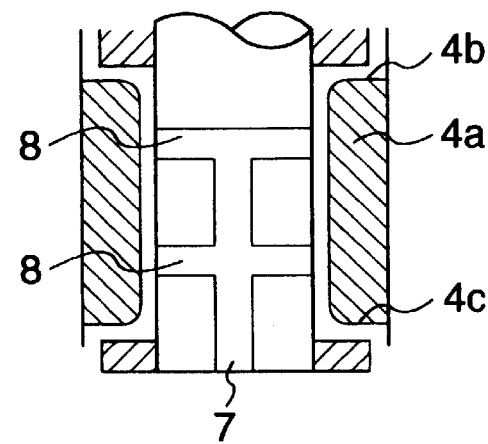
FIG. 8 is a vertical sectional view showing a bubble removing device of a third embodiment of the present invention.

FIG. 8 shows an embodiment of the case where a plurality of radial flow passages 8 are provided in the axial direction of the shaft. In this structure the radial flow passages 8 are disposed near the corners of the thrust bearings 4b and 4c where bubbles 19 easily stay, so the function of the bubble removing device 9 is enhanced.

Figure 9:
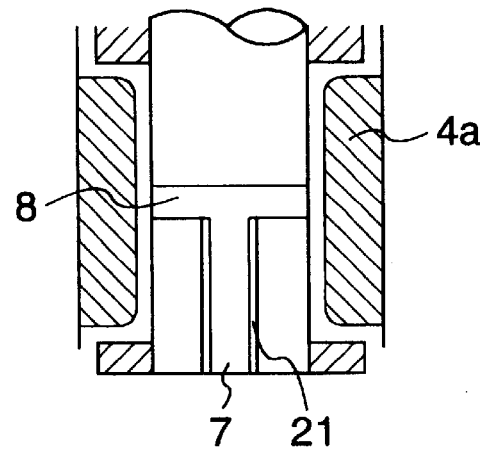
FIG. 9 is a vertical sectional view showing a bubble removing device of a fourth embodiment of the present invention.

Also, as shown in FIG. 9, when if the axial flow passage 7 is formed into a spiral groove 21 such as sucking fluid inside, the same effect as the aforementioned can be obtained.

Figure 10:
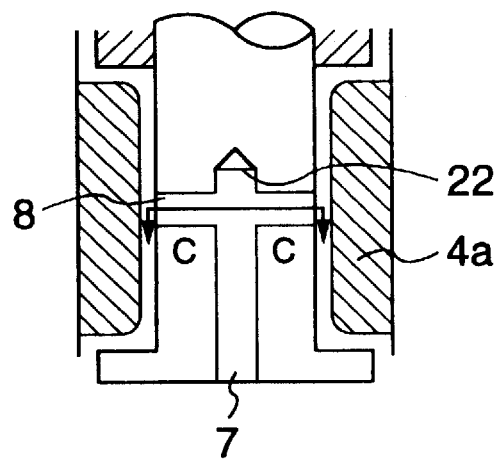
FIG. 10 is a vertical sectional view showing a bubble removing device of a fifth embodiment of the present invention.

In addition, in the case that the radial flow passage 8 of FIG. 10 is provided in the form of a cross so that it crosses the axial flow passage 7, surrounding bubbles 19 can be easily collected in a bubble collecting portion 22 when the device is at a standstill, and magnetic fluid 13 containing less bubbles can be supplied particularly when the device is started.

Figure 11:
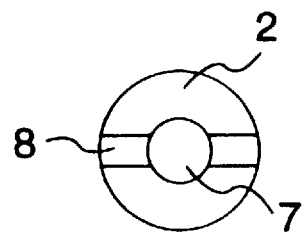
FIG. 11 is a sectional view taken substantially along line C—C of FIG. 10.
Figure 12:
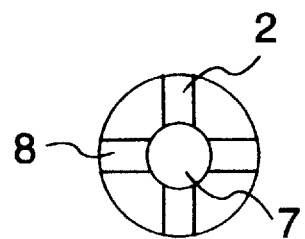
FIG. 12 is a diagram showing the disposition of radial flow passages with respect to an axial flow passage in accordance with a sixth embodiment of the present invention.

Furthermore, FIGS. 11 and 12 show the disposition of the radial flow passages 8 with respect to the axial flow passage 7. The radial flow passages 8 are symmetrically disposed with respect to the axial flow passage 7. In this case, if the diameter of the axial flow passage 7 is set so as to become greater than that of the radial flow passage 8, device performance will be enhanced because the circulation of the internal fluid and the separating operation can be smoothly performed. More preferably, if the relative relationship between the flow passage area A of the axial flow passage 7 and the flow passage area B of the radial flow passage 8 is within the range of B≧ 0.5A to A, the circulation of the internal fluid and the separating operation can be performed more effectively. For this reason, as shown in FIG. 12, the diameter of each of the four radial flow passages 8 is further reduced in comparison with the case of two radial flow passages. However, excessively increasing the number of radial flow passages is disadvantageous, because the diameter becomes small and therefore bubbles are not easily separated.

While the function of the bubble removing device 9 and the means for enhancing the function have been described, they are also influenced closely by the size of the spindle.

Figure 13:
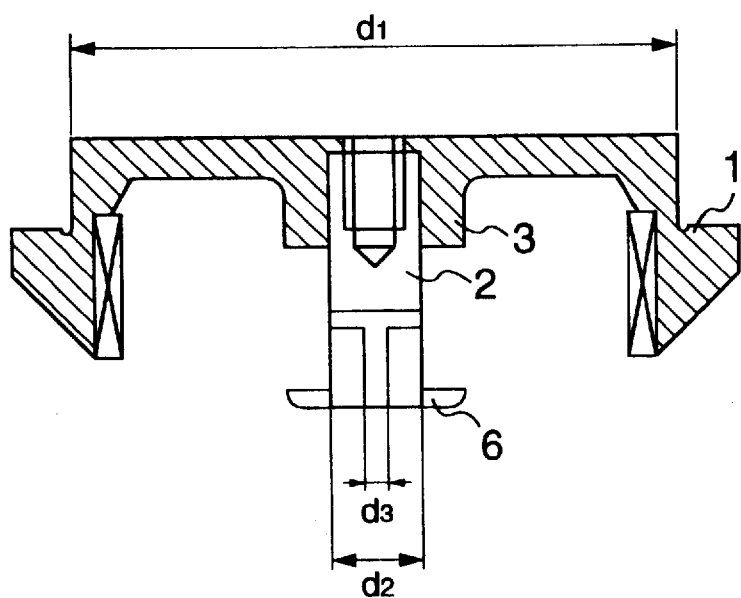
FIG. 13 is a vertical sectional view showing the rotating part of a spindle motor of a seventh embodiment of the present invention.
Figure 14A:
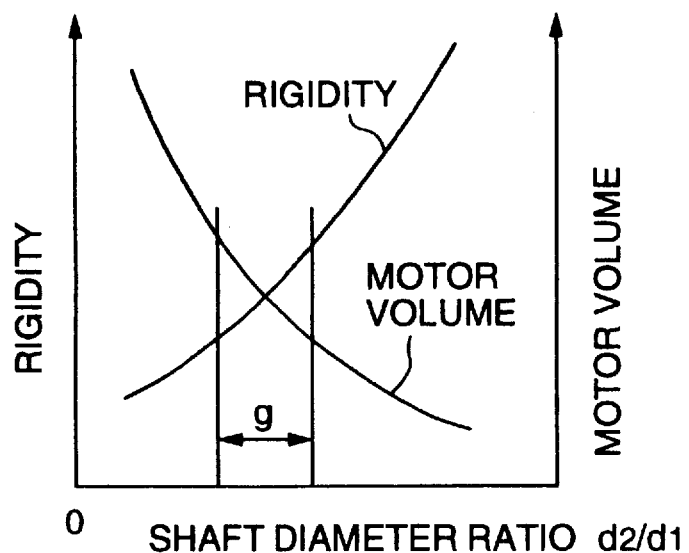
FIGS. 14A and 14B are characteristic diagrams showing the relation of rigidity, motor volume, loss, and circulation quantity with respect to spindle diameter ratio in accordance with an eighth embodiment of the present invention.
Figure 14B:
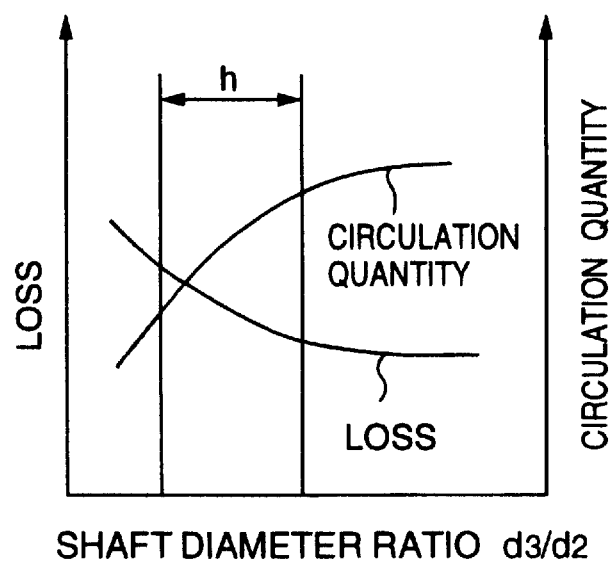

FIG. 13 shows an embodiment limiting the proportion of a spindle applied to the bearing device of the present invention. FIG. 14A shows the relation of rigidity and motor volume with respect to shaft diameter ratio $d_2/d_1$ and FIG. 14B shows the relation of loss and circulation quantity with respect to shaft diameter ratio $d_3/d_2$. The outer diameter of a hub is usually determined by the size of a magnetic disk. As shown in FIG. 14A, if a shaft diameter is increased with respect to a disk diameter, a shaft diameter ratio $d_2/d_1$ is also increased. Because the rigidity is increased, a rotating body can be stably rotated with a high degree of accuracy but a loss is also increased. Furthermore, in the structure having a motor inside a hub, the motor volume is limited and therefore the shaft diameter is also limited by the occupancy factor of the rotor magnet or the stator coil. From the limitations the shaft diameter ratio is set to the range of "g" shown in FIG. 14A. In practical use, the shaft diameter ratio reaches an appropriate value in the range of $d_2/d_1$=0.15 to 0.25. In FIG. 14B, even if the shaft diameter ratio of the shaft diameter $d_2$ and the shaft hole diameter $d_3$ were increased, the circulation quantity of fluid would show a tendency to saturate. If, on the other hand, the shaft diameter ratio is too small, a bubble removing effect will be reduced and the number of bubbles will be increased. Therefore, the shaft ratio is set to the range of "h" shown in FIG. 4B, and in practical use, it is set to a value of $d_3/d_2$=0.3 to 0.6. In the case where a device support structure is a cantilever support structure like the present invention, the device support structure can cope with all possible postures of the device, if the structure satisfies the aforementioned values and also the center of gravity of the rotating body is within the span of the bearing.

Figure 15:
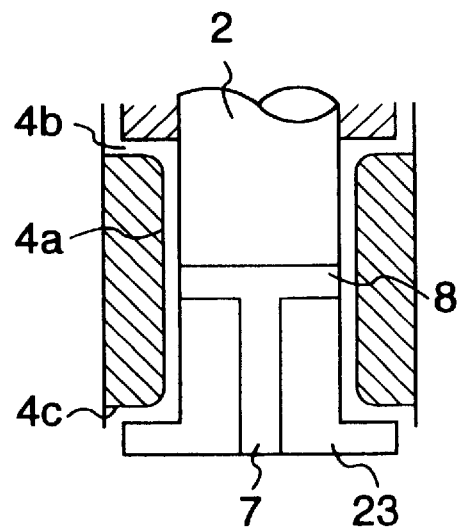
FIG. 15 is a part-sectional view of a thrust bearing portion of a ninth embodiment of the present invention.

FIG. 15 shows an embodiment where a flange portion 23 is formed integrally on the other end of a shaft 2. In FIG. 1 the thrust plate 6 is inserted and fixed to the other end of the straight shaft 2 and constitutes the thrust bearing 4c. However, because the thickness dimension of the thrust plate 6 is thin, the parallelization accuracy in the thrust plate 6 with respect to the surface of the thrust bearing 4c is difficult to assure and also the thrust plate is easily deformed by an impact force. These problems can be eliminated at a single stroke by integrally forming the flange portion 23 on the shaft 2.

Figure 16:
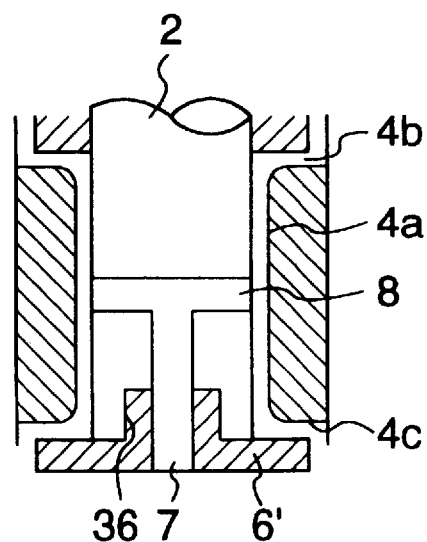
FIG. 16 is a part-sectional view of a thrust bearing portion of a tenth embodiment of the present invention.

FIG. 16 shows a vertical sectional view of another embodiment of the present invention. For the structure of the thrust bearing, as with the aforementioned embodiment, a thrust plate 6' with a boss portion 36 is inserted and fixed to the other end of a straight shaft 2 with respect to the surface of a thrust bearing 4c. The right-angle accuracy in the junction surface of the thrust plate 6', opposed to the other end of the shaft 2, is assured by a cutting operation. Therefore, the parallelization accuracy in the thrust plate 6', opposed to the surface of the thrust bearing 4c, is simply assured by bonding the junction surface to the shaft 2.

Figure 17:
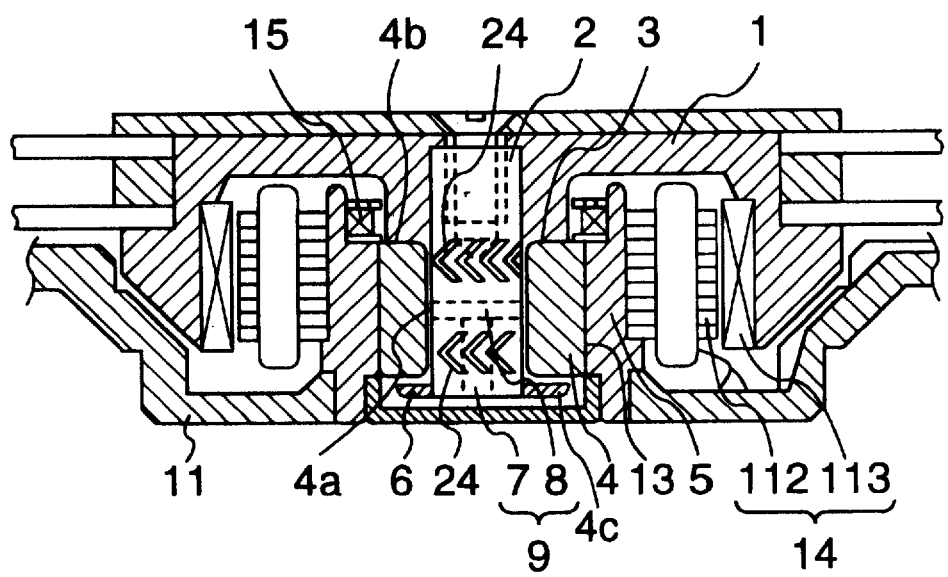
FIG. 17 is a vertical sectional view of a spindle motor of an eleventh embodiment of the present invention.

FIG. 17 shows a vertical sectional view of still another embodiment of the present invention. This embodiment is characterized in that the aforementioned bubble removing device 9 is provided in a bearing device having herringbone grooves as a dynamic-pressure generating means of the bearing portion.

The bearing device of FIG. 17 is substantially the same structure as FIG. 1. A group of herringbones 24 are provided in a radial bearing 4a constituted by the inner peripheral surface of a bearing 4 and the outer peripheral surface of a shaft 2 and also are provided in thrust bearings 4b and 4c constituted by the end surface of a boss 3 opposed to one end surface of the bearing 4, the other end surface of the bearing 4, and a thrust plate 6. In addition, a bubble removing device 9 is provided in the shaft 2, and magnetic fluid 13 is sealed as a lubricant. It is beneficial in this embodiment that the aforementioned oil supply groove is not provided, because the dynamic-pressure effect will be damaged if the groove is provided.

The operation and advantages of this device are exactly identical to the previous one. The rotating performance can be maintained at high accuracy by eliminating bubbles 19 intermixed on the sliding surface of the bearing with the action of the bubble removing device 9, and by forming stable oil film pressure on the bearing sliding surface with the pumping action of the group of herringbones 24.

Next, a description will be made of the case where the bearing device of the present invention is mounted in a magnetic disk unit.

Figure 18:
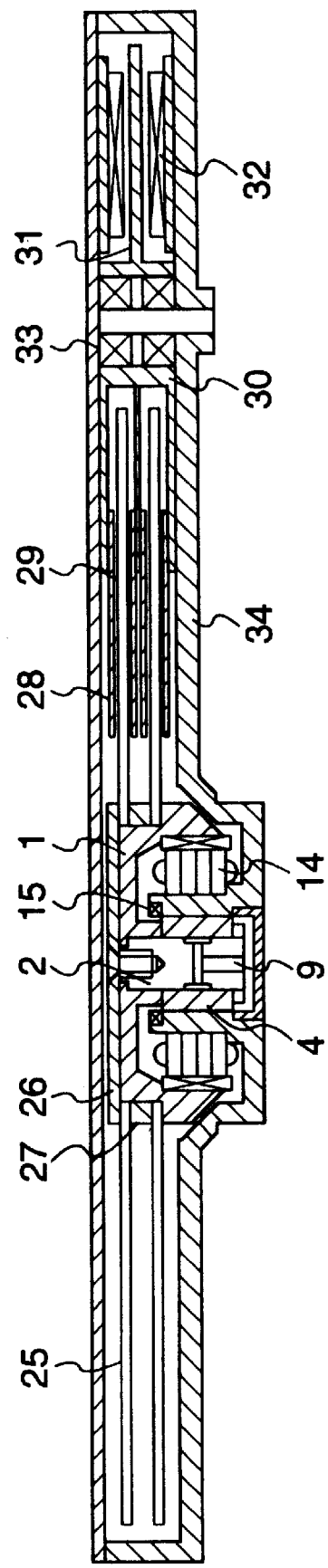
FIG. 18 is a vertical sectional view of a magnetic disk unit of the present invention.

FIG. 18 shows a vertical sectional view of the magnetic disk unit to which an embodiment of the present invention is applied. Magnetic disks 25 which are a recording medium are clamped to a hub 1 by a clamp 26 through a spacer 27. The hub 1 is supported through oil film by a sliding bearing device according to the present invention, and the hub 1 is rotated by a motor 14 disposed inside the hub 1.

Magnetic heads 28 are positioned over both surfaces of the magnetic disk 25. As the magnetic disk 25 is rotated, the magnetic head 28 floats with a very small floating quantity from the magnetic disk 25 by the dynamic-pressure effect of gas caused by the rotation of the magnetic disk 25. This floating state is kept by gas lubrication, and magnetic information is written to or read from the magnetic disk 25.

The magnetic head 28 is coupled to a carriage 30 through a load arm 29. Also, the carriage 30 is swingably supported around a center shaft and constructed so that the magnetic head 28 can be positioned over any track on the magnetic disk 25.

Furthermore, a VCM coil 31 is attached to the side of the carriage 30 opposite to the magnetic head 28. A motor is formed between the VCM coil 31 and a VCM magnet 32 provided on a base plate 11, and the magnetic head 28 can be moved to an arbitrary track position at a high speed.

Also, in order to protect the constitutional parts from external dust particles, a cover 33 is attached to the base plate 11.

Thus, the rotating magnetic disk 25 can be supported with high-rigidity fluid lubrication by the dynamic pressure generated by the asymmetrical circular-arc bearing 4a and the taper land bearings 4b and 4c provided with the bubble removing device 9, so the magnetic disk unit can cope with all possible postures. As compared with the case of using a ball bearing, the bearing device of the present invention is reduced in sound and effective to mechanical shock. For this reason, the present invention is also optimum as a spindle motor for note type personal computers and subnote type personal computers.

Furthermore, the rotational system rotates through a film of oil with non-contact, so the asynchronous vibrational component is considerably improved and is reduced to a value less than 1/10 of a ball bearing. Therefore, with the effect of reducing the asynchronous vibrational component, track density is enhanced and high-density recording becomes possible, so device size can be reduced and device capacity can be increased. Magnetic disks are not allowed to be contaminated with oil, but they can be used under a clean environment by the effective sealing device.

While a description has been made of the case where the bearing device according to the present invention is applied to a magnetic disk unit, the same advantageous effects are also obtainable for an optical disk unit where magnetic disks are replaced with optical disks. In addition, even when the bearing device according to the present invention is employed in laser-beam polygon mirror motors and VTR cylinder motors, the same operation and advantageous effects are obtainable.

As described above, the bearing device of the present invention and the spindle motor using the bearing device are provided with means for removing bubbles from the dynamic-pressure generating portion of the sliding bearing where a lubricant is sealed. Therefore, because an appropriate lubricating film is formed on the dynamic-pressure generating portion, a suitable pressure distribution can be formed, the rigidity of the bearing is enhanced, and the high-accurate rotational performance of the device can be maintained.

In addition, by using the aforementioned bearing device or the spindle motor, operational characteristics become stable and there can be provided magnetic disk units, optical disk units, laser beam printers, and video tape recorders where the reliability of device operation is better.

We claim:

1. A bearing device comprising a shaft and a sliding bearing rotatably supporting the shaft where a lubricant is sealed, said sliding bearing including a radial bearing portion surrounding said shaft, said radial bearing portion having a plurality of asymmetrical circular arc grooves having a shape such that a gap between said shaft and said radial bearing portion has a plurality of wide gap portions and narrow gap portions in a rotational direction of said shaft, the bearing device further comprising bubble removing means, operated by rotation of said shaft for removing bubbles from a bearing surface of the sliding bearing and discharging the bubbles from an end of said shaft to a low-pressure side outside the sliding bearing, and a thrust bearing comprising a thrust plate provided at the end of said shaft, said thrust plate having a diameter larger than a diameter of said shaft, and a portion of said sliding bearing opposed to said thrust plate.

2. A bearing device comprising a shaft and a sliding bearing rotatably supporting a shaft where a lubricant is sealed, said sliding bearing including a radial bearing portion surrounding said shaft, said radial bearing portion having a plurality of asymmetrical circular arc grooves having a shape such that a gap between said shaft and said radial bearing portion has a plurality of wide gap portions and narrow gap portions in a rotational direction of said shaft, and a thrust bearing comprising a thrust plate provided at an end of said shaft, said thrust plate having a diameter larger than a diameter of said shaft, and a portion of said sliding bearing opposed to said thrust plate, the bearing device further comprising:

a first flow passage formed in said shaft along a rotational axis direction of said shaft;

a second flow passage connected from said first flow passage to the outer peripheral surface of said shaft opposed to a bearing surface of said sliding bearing;

an end of said first flow passage opposite to said second flow passage connected to an opening provided in one end surface of said shaft, said opening being at a low-pressure side outside the sliding bearing; and a third flow passage connecting said bearing surface to said opening.

3. A bearing device according to claim 2, wherein said third flow passage is provided as a lubricant sink which covers the end surface of the shaft in which said opening is provided.

4. A bearing device according to claim 2, wherein an opening of said second flow passage at said outer peripheral surface of said shaft opposes said bearing surface of said sliding bearing about midway along an axial length of said radial bearing portion.

5. A bearing device including a shaft fitted in a hub and a sliding bearing contacted internally with a housing and sealing a lubricant in a gap between said shaft and said sliding bearing to rotatably support said shaft, the bearing device comprising:

a radial bearing with first dynamic-pressure generating means comprising a plurality of asymmetrical circular arc grooves having a shape such that a gap between said shaft and said radial bearing portion has a plurality of wide gap portions and narrow gap portions in a rotational direction of said shaft, a first thrust bearing having a bearing surface provided at one end on the hub side of said radial bearing so as to be opposed to a boss end surface of said hub and second dynamic-pressure generating means provided on either said bearing surface or said boss end surface;

a flange provided on an end of said shaft, said flange having a diameter larger than a diameter of said shaft;

a second thrust bearing having a bearing surface provided at the other end of said radial bearing so as to be opposed to a surface on the hub side of said flange and third dynamic-pressure generating means provided on either said bearing surface or the flange surface opposed to the bearing surface;

first and second flow passages formed in said shaft, the first flow passage extending along the rotational axis direction of the shaft and being opened at a low-pressure side outside the sliding bearing at the end of the shaft opposite to the end of the shaft fitted in the hub, and the second flow passage being connected from said first flow passage to the outer peripheral surface of said shaft opposed to said bearing surface of the sliding bearing;

a space formed by said flange and said housing around the end surface of said shaft on which the flange is provided, the space being connected to the surface of said second thrust bearing; and a lubricant sealed in said bearing surface and said space.

6. A bearing device according to claim 5, wherein said space is formed by a seal cap firmly attached to said housing.

7. A bearing device according to claim 5, wherein a bubble guide groove is provided in either said outer peripheral surface of the shaft or said inner peripheral surface of the radial bearing.

8. A bearing device according to claim 5, wherein said second flow passage comprises a plurality of flow passages provided in said rotational axis direction of the shaft.

9. A bearing device according to claim 5, wherein a spiral groove is formed in the surface of said first flow passage so that said lubricant is sucked from said opening provided in the shaft end surface into said first flow passage by rotation of said shaft.

10. A bearing device according to claim 5, wherein said second flow passage comprises a plurality of flow passages which extend from said first flow passage in the radial direction of said shaft and which are disposed on the outer peripheral surface of said shaft at equal intervals.

11. A bearing device according to claim 5, wherein a diameter ratio of the diameter of said shaft to the diameter of said hub is set to a range of 0.15 to 0.25 and a diameter ratio of the diameter of said first flow passage to the diameter of said shaft is set to a range of 0.3 to 0.6.

12. A bearing device according to claim 5, wherein an opening of said second flow passage at said outer peripheral surface of said shaft opposes said bearing surface of said sliding bearing about midway along an axial length of said radial bearing portion.

13. A spindle motor having a shaft fitted in a hub, a housing provided in opposition to aid hub, a stator attached to said housing, and a rotor magnet opposed to said stator and provided in said hub, comprising:

a sliding bearing rotatably supporting said shaft, said sliding bearing being sealed with a lubricant, said sliding bearing including a radial bearing portion surrounding said shaft, said radial bearing portion having a plurality of asymmetrical circular arc grooves having a shape such that a gap between said shaft and said radial bearing portion has a plurality of wide gap portions and narrow gap portions in a rotational direction of said shaft, and a thrust bearing comprising a thrust plate provided at an end of said shaft, said thrust plate having a diameter larger than a diameter of said shaft, and a portion of said sliding bearing opposed to said thrust plate;

a first flow passage formed in said shaft along a rotational axis direction of said shaft;

a second flow passage connected from said first flow passage to the outer peripheral surface of said shaft opposed to a bearing surface of said sliding bearing;

an end of said first flow passage opposite to said second flow passage connected to an opening provided in one end surface of said shaft, said opening being at a low-pressure side outside the sliding bearing; and a third flow passage connecting said bearing surface to said opening.

14. A spindle motor according to claim 13, wherein an opening of said second flow passage at said outer peripheral surface of said shaft opposes said bearing surface of said sliding bearing about midway along an axial length of said radial bearing portion.

15. A magnetic disk unit comprising magnetic disks, a hub to which said magnetic disks are clamped by a clamp, a shaft fitted in and rotatably supported by a sliding bearing connected to said hub, said sliding bearing including a radial bearing portion surrounding said shaft, said radial bearing portion having a plurality of asymmetrical circular arc grooves having a shape such that a gap between said shaft and said radial bearing portion has a plurality of wide gap portions and narrow gap portions in a rotational direction of said shaft, and a thrust bearing comprising a thrust plate provided at an end of said shaft, said thrust plate having a diameter larger than a diameter of said shaft, and a portion of said sliding bearing opposed to said thrust plate, a housing provided in opposition to said hub, a stator attached to said housing, and a rotor magnet opposed to said stator and provided in said hub, the magnetic disk unit further comprising bubble removing means, operated by rotation of said shaft for removing bubbles from a bearing surface of the sliding bearing and discharging the bubbles from an end of said shaft to a low-pressure side outside the sliding bearing.

16. A magnetic disk unit according to claim 15, wherein said bubble removing means is constituted by a first flow passage formed in said shaft along a rotational axis direction of said shaft;

a second flow passage connected from said first flow passage to the outer peripheral surface of said shaft opposed to a bearing surface of said sliding bearing;

an end of said first flow passage opposite to said second flow passage connected to an opening provided in one end surface of said shaft; and a third flow passage connecting said bearing surface to said opening.

17. A magnetic disk unit according to claim 16, wherein a diameter ratio of the diameter of said shaft to the diameter of said hub is set to a range of 0.15 to 0.25 and a diameter ratio of the diameter of said first flow passage to the diameter of said shaft is set to a range of 0.3 to 0.6.

* * * * *